March 12, 1929. H. C. WELLMAN 1,704,814
PROJECTOR
Filed Sept. 30, 1926
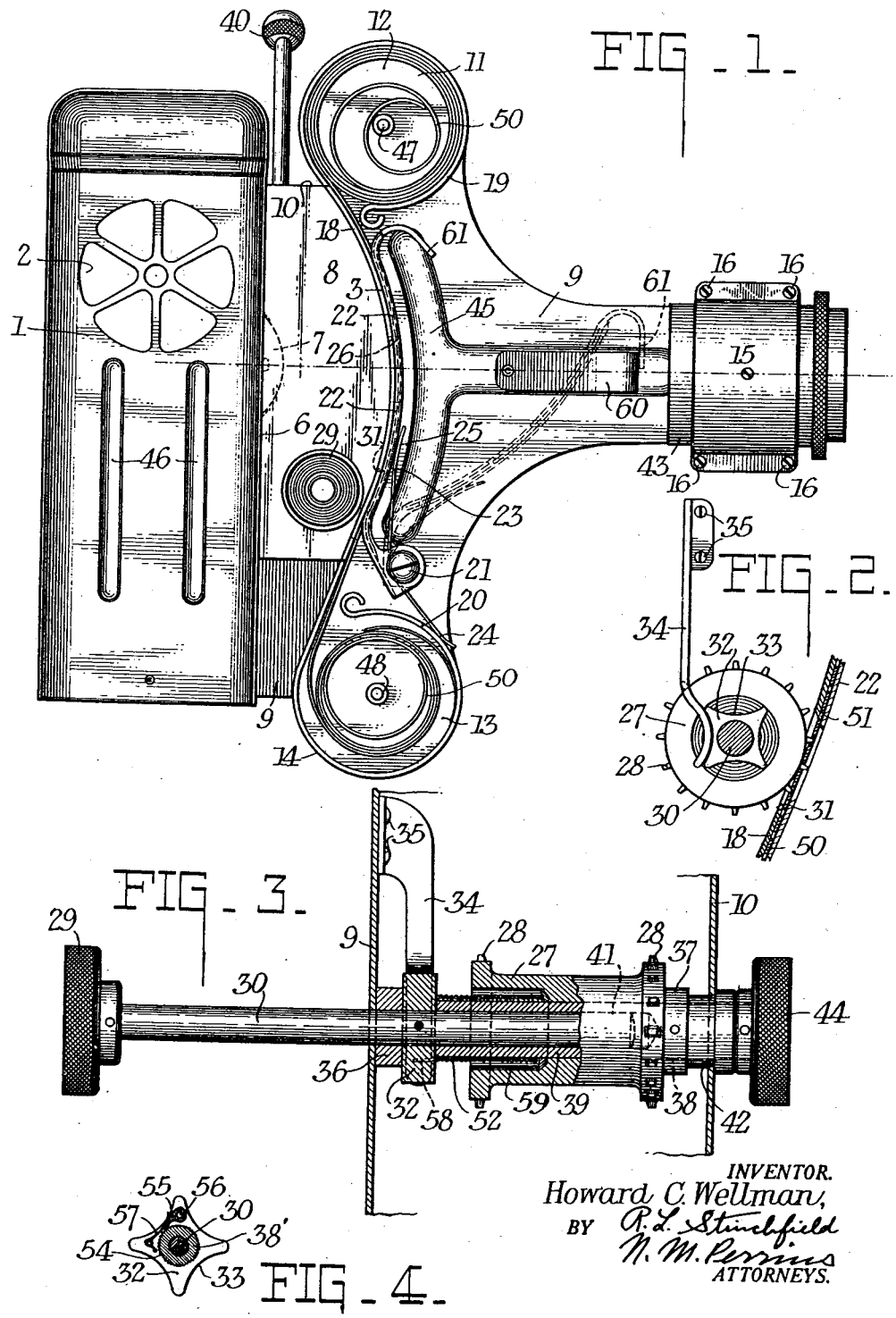
INVENTOR.
Howard C. Wellman,
BY
ATTORNEYS.

Patented Mar. 12, 1929.

1,704,814

UNITED STATES PATENT OFFICE.

HOWARD C. WELLMAN, OF ROCHESTER, NEW YORK, ASSIGNOR TO EASTMAN KODAK COMPANY, OF ROCHESTER, NEW YORK, A CORPORATION OF NEW YORK.

PROJECTOR.

Application filed September 30, 1926. Serial No. 138,648.

This invention relates to a projector and more particularly to such an apparatus through which a strip of film is advanced a step at a time.

The objects of this invention are to provide a simple structure by which the film may be moved accurately by hand as desired, and to furnish provision for adjusting the position of the film slightly for framing without affecting the accuracy of the pulldown movement. These and other objects are attained by the mechanism fully described hereinafter, reference being made to the accompanying drawing, wherein Fig. 1 is a side elevation of a projector embodying my invention;

Fig. 2 is a view of the means for holding the picture area at definitely centered positions;

Fig. 3 is a fragmentary view, partly in section, showing the sprocket and its mounting;

Fig. 4 is a fragmentary section showing an alternative form of clutch.

The projector in which I have chosen to illustrate my invention comprises a lamphouse 1, which is shown as a three-sided open casing adapted to be placed over a suitable lamp and support (not shown) having complementary parts. A ventilating opening 2 and strengthening bosses 46 are shown in the lamphouse. On the front wall 6 is carried the usual condenser 7, and a casing 8 comprising walls 9 and 10. The side wall 9 extends up to form a wall 11 of the upper film chamber 12 and down to form a side wall 13 of lower film chamber 14. The front wall of the casing comprises a sheet of metal 18 bowed to fit the front edge of wall 10, along which it is extended laterally to form a flange 3, the ends of which are in alignment with the top and bottom of wall 10. Plate 18 is continued at its ends to form the cylindrical walls 19 and 20 of the open film chambers 12 and 14. A screw 21 is positioned on wall 9 forwardly of the plate 18 and on this is pivoted the member 22, which is bowed to fit plate 18, and which is resiliently pressed against it by spring 23 coiled around the screw and having its ends 24 and 25 contacting the cylindrical wall 20 and member 22 respectively.

Registering apertures are formed in members 18 and 22, which constitute a gate, to form a window 26 in alignment with condenser 7. Wall 9 is continued forwardly and, with the complementary member 15 attached thereto by screws 16, embraces the objective mount 43, the objective being in alignment with the window 26 and condenser 7. A strengthening boss 45 is formed in wall 9, which also carries a spring 60 behind which the extension 61 on the hinged presser member 22 can be snapped, holding the gate open while the film is threaded through it.

The handle 40 is part of a mechanism, not shown, for moving a pointer across the gate, this being described in the pending application of A. Stuber, Serial No. 138,645, filed September 30, 1926.

The apparatus shown is used principally for the projection of still pictures from a strip of perforated film 50, a loose coil of which is placed in the upper chamber 12 over pin 47. The film is threaded between presser 22 and fixed wall 18 and as the film is advanced it will coil itself loosely about pin 48 in chamber 14. The film chambers and the gate are open from the side shown in Fig. 1.

A sprocket 27 having teeth 28 extending through slots 31 in wall 18 to engage perforations 51 of the film is supported in the casing between walls 9 and 10. A shaft 30 with a knurled finger piece 29 extends through wall 9 and journal block 36 and carries a block 32 having four concave sides 33, engaged by a bowed leaf spring 34 attached to wall 9 by screws 35.

Sprocket 27 carries at one end a ring 37 by which it is pinned to sleeve shaft 38 into the hollow end 39 of which the end 41 of shaft 30 extends. The solid end of shaft 38 extends through the bearing 42 in wall 10 and carries at its end a knurled finger piece 44. The bore of sprocket 27 is larger at one end leaving an annular space 59 around shaft 38. In this space is positioned a coiled spring 52 fitting shaft 38 rather closely and attached at one end to block 32 at 58.

The direction of coiling of the wire of this spring is such that if the handle 29 is turned in the direction to advance the film, the spring will bind on shaft 38 and the two shafts will turn together. If handle 29 is turned in the reverse direction, the spring 52 will not grip the shaft 38 and will not turn it. If handle 44 is turned in the direction to advance the film, it will turn the sprocket and shaft 38 without movement of shaft 30, while if it is turned in the reverse direction, it will turn both shafts.

The spring 34 holds the shaft 30 in position and a quarter turn of the sprocket and shaft will bring another picture into exhibiting position. If succeeding pictures are uniformly framed with respect to every fourth perforation in the film, the only action on the part of the operator is to turn handle 29 a quarter revolution to project the pictures in succession. If a picture is out of frame, he can correct this by turning handle 44 in a forward direction; or if the misframe is in the opposite direction, he can turn the film back a whole frame by handle 44 and then turn handle 44 ahead sufficiently to correct framing. To show pictures in the reverse order, or to return to a previously exhibited picture in the normal order, the handle 44 is turned in the reverse direction turning the centering block and shaft 30 and not affecting the framing.

It is evident that spring 52 constitutes a one-way friction clutch, and that other one-way clutches of the friction type or of other types may be substituted for it. An instance of such an alternative clutch is shown in Fig. 4, where 30 is the shaft carrying a block 32 with concave sides 33 as previously described. The sleeve shaft 38' corresponds to shaft 38 already described but has, adjacent block 32, fine ratchet teeth 54 adapted to be engaged by pawl 55 carried on pivot pin 56 on block 32 and urged toward the ratchet teeth by spring 57. The operation of this is similar to the mechanism first described but it does not permit of such fine adjustment.

It is obvious that numerous other embodiments of my invention are possible, and I contemplate as within my invention all such modifications and equivalents as fall within the scope of the appended claims.

Having thus described my invention, what I claim as new and desire to secure by Letters Patent is:

1. In a projector, a frame, a gate on said frame with an exposure window, a sprocket rotatably supported by the frame in position to engage a film band and move it past said window, means for turning said sprocket, means for centering said turning means at definite predetermined angular intervals, a one-way clutch between and connecting said sprocket and turning means, and a second means for turning the sprocket independently of the first named means.

2. In a projector, a frame, a gate on said frame with an exposure window, a sprocket rotatably supported by the frame in position to engage a film band and move it past said window, a manipulating handle rotatably carried by the frame, a one-way clutch between and connecting said handle and sprocket, means for holding said handle at predetermined positions, separated by uniform, angular intervals and a second handle connected to the sprocket whereby it may be turned independently of the first named handle.

3. In a projector, a frame, a gate with an exposure window, a shaft rotatably mounted in the frame and carrying a sprocket wheel adapted to engage a perforated film and move it past said window, a handle on the shaft whereby the sprocket may be turned manually in either direction, a second shaft rotatably mounted in the frame, a manipulating handle on the second shaft and a one-way clutch connection between the two shafts, whereby the sprocket may be turned in one direction only by the last named handle.

4. In a projector, a frame, a gate with an exposure window, a shaft rotatably mounted in the frame and carrying a sprocket wheel adapted to engage a perforated film and move it past said window, a handle on the shaft whereby the sprocket may be turned manually in either direction, a second shaft rotatably mounted in the frame, centering means carried by said second shaft at even angular intervals thereupon, and a one-way clutch connection between the two shafts whereby the sprocket may be turned in one direction only by the second shaft.

5. In a projector, a frame, a gate with an exposure window, a shaft rotatably mounted in the frame, a sprocket wheel carried thereby and positioned to engage a perforated film band and move it past said window, a manipulating handle connected to said shaft, a second shaft rotatably mounted in the frame coaxially with the first shaft, means for holding said second shaft at predetermined positions separated by uniform angular intervals, and a one-way, friction clutch connecting said shafts.

6. In a projector, a frame, a gate with an exposure window, a shaft rotatably mounted in the frame, a sprocket wheel carried thereby and positioned to engage a perforated film band and move it past said window, a manipulating handle connected to said shaft, a member rotatably carried by the frame coaxially with the shaft, means for holding said member at predetermined positions separated by uniform angular intervals, and a spring coiled snugly around said shaft and having one end attached to said member and constituting a one-way friction clutch, the spring constituting the sole driving connection between the shaft and the member.

7. In a projector, a frame, a gate with an exposure window, a sleeve shaft rotatably mounted in the frame, a sprocket wheel rigidly attached thereto and positioned to engage a perforated film and move it past said window, a handle carried by said shaft, a second shaft rotatably mounted in the frame coaxially with the first and extending within the sleeve shaft, a block rigidly carried by said second shaft and having centering depressions at uniform angular intervals, a spring carried by said frame and pressing yieldably against said block and adapted to engage the depressions and thereby hold the block in centered position, and a spring coiled snugly around said sleeve shaft and attached at one end to the block and constituting a one-way friction clutch between the two shafts.

Signed at Rochester, New York, this 25 day of September, 1926.

HOWARD C. WELLMAN.